US010153715B2

(12) United States Patent
Aoki (10) Patent No.: US 10,153,715 B2
(45) Date of Patent: Dec. 11, 2018

(54) MOTOR DRIVING CONTROL DEVICE AND MOTOR DRIVING CONTROL METHOD (71) Applicant: Minebea Mitsumi Inc., Nagano (JP)

(72) Inventor: Masato Aoki, Iwata (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/890,632

(22) Filed: Feb. 7, 2018

(65) Prior Publication Data

US 2018/0234038 A1 Aug. 16, 2018

(30) Foreign Application Priority Data

Feb. 14, 2017 (JP) .................................. 2017-025308

(51) Int. Cl.
*H02K 3/12* (2006.01)
*H02P 6/15* (2016.01)
(Continued)

(52) U.S. Cl.
CPC ................ *H02P 6/15* (2016.02); *B60L 3/003* (2013.01); *H02M 7/53875* (2013.01);
(Continued)

(58) Field of Classification Search
CPC ...... H02P 1/00; H02P 3/00; H02P 6/00; H02P 3/12; H02P 3/16; H02P 3/22; H02P 6/145;
(Continued)

(56) References Cited

U.S. PATENT DOCUMENTS 6,211,635 B1    4/2001 Kambe et al.
7,847,498 B2 *  12/2010 Shibuya .................. H02P 6/185
                                                    318/400.01
9,777,710 B2 * 10/2017 Muik ..................... F03D 7/0244

FOREIGN PATENT DOCUMENTS

JP    2000-125584 A    4/2000

* cited by examiner

Primary Examiner — Antony M Paul
(74) Attorney, Agent, or Firm — Pearne & Gordon LLP (57) ABSTRACT A motor driving control device includes: a motor driving unit for selectively energizing coils of a plurality of phases of a motor; a control circuit unit for outputting a driving control signal to the motor driving unit to control an operation of the motor driving unit; and a position detector corresponding to one phase out of the plurality of phases, the position detector outputting a position signal having a phase varying according to a position of a rotor of the motor, wherein when starting activation of the motor, the control circuit unit executes first control for causing the motor to perform short-circuit braking, and second control for starting a first lock operation in which the rotor is locked by energizing coils of a predetermined energization phase out of the plurality of phases with a first current value after the first control is executed, and when executing the first control, the control unit performs the short-circuit braking from the start of the short-circuit braking of the motor until variation of a predetermined pattern of the phase of the position signal has not been detected over a first predetermined time, or from the start of the short-circuit braking of the motor until a second predetermined time longer than the first predetermined time has elapsed.

7 Claims, 7 Drawing Sheets (51) Int. Cl.
*H02P 6/08* (2016.01)
*H02P 27/06* (2006.01)
*B60L 3/00* (2006.01)
*H02M 7/5387* (2007.01)
*H02P 6/24* (2006.01)
*H02P 3/12* (2006.01)
*H02P 6/16* (2016.01)

(52) U.S. Cl.
CPC ............... *H02P 3/12* (2013.01); *H02P 6/085* (2013.01); *H02P 6/16* (2013.01); *H02P 6/24* (2013.01); *H02P 27/06* (2013.01)

(58) Field of Classification Search
CPC ...... H02P 6/14; H02P 6/16; H02P 6/24; H02P 8/08; H02P 8/30; H02P 9/009; H02P 21/00; H02P 23/00; H02P 27/00; H02P 3/18; H02P 27/04; H02P 27/06; H02P 3/14; H02P 29/04; H02K 7/10; H02K 17/32
USPC ............ 318/400.01, 400.02, 400.14, 400.26, 318/400.27, 400.38, 400.39, 400.4, 299, 318/362, 370, 371, 375, 721, 759, 700, 318/701, 727, 799, 800, 801; 388/800, 388/820
See application file for complete search history.

MOTOR DRIVING CONTROL DEVICE AND MOTOR DRIVING CONTROL METHOD

CROSS REFERENCE TO RELATED APPLICATIONS

This application claims the benefit of Japanese Patent Application No. 2017-025308, filed Feb. 14, 2017, which is hereby incorporated by reference in its entirety.

BACKGROUND

Technical Field

The present disclosure relates to a motor driving control device and a motor driving control method, and particularly to a motor driving control device and a motor driving control method capable of performing so-called single-sensor driving.

Background

A device for driving a motor by so-called single-sensor driving is known as a motor driving control device for driving a motor. For example, a device for driving a motor by using only one hall sensor for detecting a magnetic pole position of the motor is known.

When the motor is driven by single-sensor driving, it is impossible to specify the magnetic pole position unlike a case where plural sensors are used. Therefore, a method of performing rotor-lock before forced commutation is performed to start activation control, and then starting activation is carried out. The rotor-lock is a control operation of positioning a rotor at a predetermined position.

Patent Document 1 (Japanese Patent Laid-Open No. 2000-125584) discloses a motor driving device having a single hall element for braking, stopping and positioning a rotor based on an output signal of the hall element.

When the rotor-lock is performed before the activation control is started as described above, a short-circuit braking time or a lock time may be set according to the state of the motor. However, when the short-circuit braking time or the lock time is set as described above, it may take a long time until the activation of the motor has been completed.

That is, various states such as a state where the motor has been already stopped, a state where the motor rotates in reverse and a state where the motor rotates forward before the activation is executed may be considered. Therefore, in the case of performing the control for the rotor-lock, it is necessary to set the short-circuit braking time or the lock time according to the state that takes the longest time to stop the rotor. However, when the short-circuit braking time or the lock time is set as described above, it also takes time until activation control is started even in a state where it takes little time to stop the rotor, and it takes a long time until the activation of the motor has been completed.

SUMMARY

The present disclosure is related to providing a motor driving control device and a motor driving control method capable of quickly activating a motor.

In accordance with an aspect of the present disclosure, a motor driving control device includes: a motor driving unit for selectively energizing coils of a plurality of phases of a motor; a control circuit unit for outputting a driving control signal to the motor driving unit to control an operation of the motor driving unit; and a position detector corresponding to one phase out of the plurality of phases, the position detector outputting a position signal having a phase varying according to a position of a rotor of the motor, wherein when starting activation of the motor, the control circuit unit executes first control for causing the motor to perform short-circuit braking, and second control for starting a first lock operation in which the rotor is locked by energizing coils of a predetermined energization phase out of the plurality of phases with a first current value after the first control is executed, and when executing the first control, the control unit performs the short-circuit braking from the start of the short-circuit braking of the motor until variation of a predetermined pattern of the phase of the position signal has not been detected over a first predetermined time, or from the start of the short-circuit braking of the motor until a second predetermined time longer than the first predetermined time has elapsed.

Preferably, when executing the first control, the control circuit unit monitors the position signal every first monitoring time, performs counting of the first predetermined time continuously from a previous monitoring time when the variation of the predetermined pattern of the phase of the position signal has not been detected since the previous monitoring time, and resets the count of the first predetermined time when the variation of the predetermined pattern of the phase of the position signal is detected from the previous monitoring time.

Preferably, upon execution of the second control, the control circuit unit performs the first lock operation from the start of the first lock operation until the variation of the predetermined pattern of the phase of the position signal has not been detected over a third predetermined time, or from the start of the first lock operation until a fourth predetermined time longer than the third predetermined time has elapsed.

Preferably, when executing the second control, the control circuit unit monitors the position signal every second monitoring time, performs counting of the third predetermined time continuously from a previous monitoring time when the variation of the predetermined pattern of the phase of the position signal has not been detected since the previous monitoring time, and resets the count of the third predetermined time when the variation of the predetermined pattern of the phase of the position signal is detected from the previous monitoring time.

Preferably, after the first lock operation is performed, the control circuit unit further executes third control for performing, for a fifth predetermined time, a second lock operation in which the rotor is locked by energizing coils of a predetermined energization phase out of the plurality of phases with a second current value smaller than the first current value.

Preferably, when rotation of the rotor of the motor does not stop at the time when the first lock operation is finished, the control circuit unit advances an energization timing to the coils of the plurality of phases and causes the motor driving unit to perform the energization.

In accordance with another aspect of the present disclosure, a motor driving control method for controlling driving of a motor by using a motor driving control device including a motor driving unit for selectively energizing coils of a plurality of phases of the motor, a control circuit unit for outputting a driving control signal to the motor driving unit to control an operation of the motor driving unit, and a position detector corresponding to one phase out of the plurality of phases, the position detector outputting a position signal having a phase varying according to a position of a rotor of the motor, comprises: a first control step for performing short-circuit braking of the motor when starting activation of the motor; and a second control step for starting a first lock operation in which coils of a predetermined energization phase out of the plurality of phases are energized with a first current value to lock the rotor after the first control step is executed, wherein when the first control step is executed, the short-circuit braking is performed from the start of the short-circuit braking of the motor until variation of a predetermined pattern of the phase of the position signal has not been detected over a first predetermined time, or from the start of the short-circuit braking of the motor until a second predetermined time longer than the first predetermined time has elapsed.

According to the present disclosure, a motor driving control device and a motor driving control method capable of quickly activating a motor can be provided.

DETAILED DESCRIPTION

A motor driving control device according to an embodiment of the present disclosure will be described.

Embodiment

Figure 1:
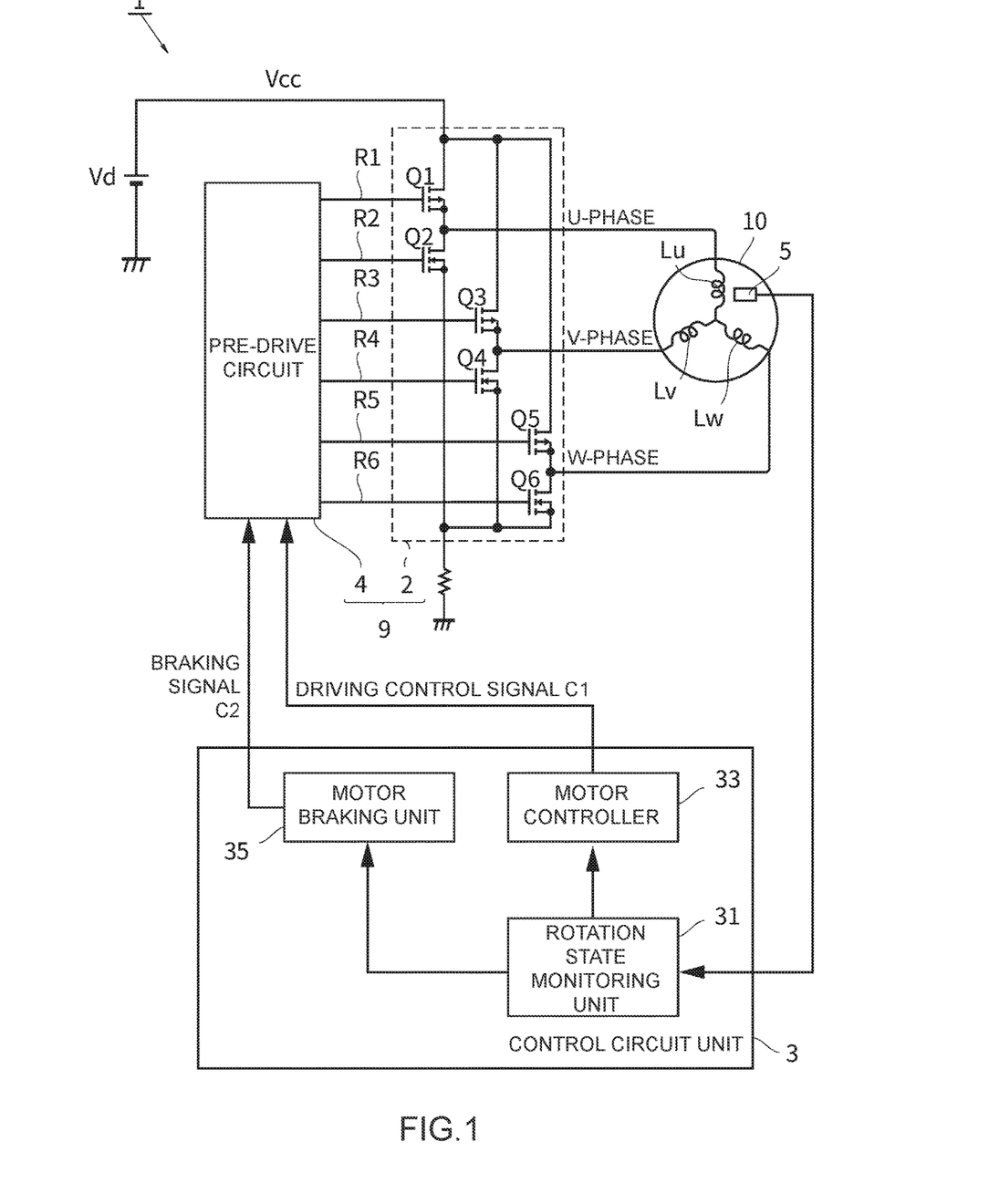
FIG. 1 is a diagram showing the configuration of a motor driving control device according to an embodiment of the present disclosure.

FIG. 1 is a diagram showing the configuration of a motor driving control device 1 according to an embodiment of the present disclosure.

As shown in FIG. 1, a motor driving control device 1 includes a control circuit unit 3, a position detector 5, and a motor driving unit 9. The motor driving control device 1 supplies driving power to a synchronous motor (an example of a motor) 10 to drive the synchronous motor 10. The synchronous motor 10 according to the present embodiment is a three-phase motor having coils Lu, Lv and Lw of U-phase, V-phase and W-phase, respectively.

The position detector 5 outputs a position signal corresponding to the position of a rotor of the synchronous motor 10. The position detector 5 is a magnetic sensor such as a hall element or a hall IC, for example, and a hall signal is output as the position signal. The position signal output from the position detector 5 is input to the control circuit unit 3. The position detector 5 detects the position of the rotor at one place of the synchronous motor 10 and outputs the position signal. For example, one position detector 5 is provided for the coil Lu of U-phase. During one rotation of the rotor, the position signal changes from a low level to a high level (rises; rising edge) when the rotor passes a predetermined position (when the rotor is located at a first rotational position), and the position signal changes from the high level to the low level (falls; falling edge) when the rotor passes a predetermined position different from the foregoing predetermined position (when the rotor is located at a second rotational position). The position signal is a signal set periodically to the high level or the low level according to the rotation of the rotor. The position detector 5 corresponds to any one phase of the U-phase, V-phase and W-phase of the synchronous motor 10. That is, the first rotational position and the second rotational position are positions corresponding to any one phase of the synchronous motor 10. The position signal is a signal having a phase varying according to the position of the rotor, that is, the positional relationship between any one phase of the synchronous motor 10 and the rotor. A signal repeating the high level and the low level periodically may be directly output as a position signal from the position detector 5, or an analog position signal output from the position detector 5 may be input to the control circuit unit 3 and then converted to a signal set periodically to the high level or the low level (in the following description, the signal to which the analog position signal has been converted as described above is also called a "position signal").

In the present embodiment, only one position detector 5 is provided. That is, a position signal detected at only one place of the synchronous motor 10 is input to the control circuit unit 3. A plurality of position detectors 5 corresponding to the respective phases may be provided, and a position signal output from only a position detector 5 at one place out of the position detectors 5 may be input to the control circuit unit 3 and then used. That is, in the present embodiment, the position signal output from one position detector 5 is input to the control circuit unit 3. The motor driving control device 1 drives the synchronous motor 10 by the single-sensor method using only one position detector 5 for detecting the position of the rotor.

The motor driving unit 9 selectively energizes the coils Lu, Lv and Lw of plural phases of the synchronous motor 10. The motor driving unit 9 has an inverter circuit 2 and a pre-drive circuit 4. A driving control signal C1 output from the control circuit unit 3 is input to the motor driving unit 9.

The inverter circuit 2 selectively energizes the coils Lu, Lv and Lw of three phases of the synchronous motor 10 based on driving signals R1 to R6 output from the pre-drive circuit 4 to control the rotation of the synchronous motor 10.

In the present embodiment, the inverter circuit 2 has six switching elements Q1 to Q6 for supplying driving current to the respective coils Lu, Lv and Lw of the synchronous motor 10. The switching elements Q1, Q3 and Q5 are high-side switching elements each comprising MOSFET (Metal-Oxide-Semiconductor Field Effect Transistor) of a P-channel arranged on the positive electrode side of a DC power source Vcc. The switching elements Q2, Q4 and Q6 are low-side switching elements each comprising MOSFET of an N-channel arranged on the negative electrode side of the DC power source Vcc. The two switching elements are connected to each other in series in each of the combination of the switching elements Q1 and Q2, the combination of the switching elements Q3 and Q4 and the combination of the switching elements Q5 and Q6. These three pairs of series circuits are connected to one another in parallel to configure a bridge circuit. The connection point between the switching elements Q1 and Q2 is connected to the coil Lu of U-phase, the connection point between the switching elements Q3 and Q4 is connected to the coil Lv of V-phase, and the connection point between the switching elements Q5 and Q6 is connected to the coil Lw of W-phase.

The pre-drive circuit 4 has plural output terminals to be connected to the respective gate terminals of the six switching elements Q1 to Q6 of the inverter circuit 2. The driving signals R1 to R6 are output from the respective output terminals to control ON/OFF operation of the switching elements Q1 to Q6. The driving control signal C1 output from the control circuit unit 3 is input to the pre-drive circuit 4. The pre-drive circuit 4 outputs the drive signals R1 to R6 based on the driving control signal C1 to operate the inverter circuit 2. That is, the inverter circuit 2 selectively energizes the coils Lu, Lv and Lw of the respective phases of the synchronous motor 10 based on the driving control signal C1.

The control circuit unit 3 outputs the driving control signal C1 to the motor driving unit 9 to control the operation of the motor driving unit 9. The control circuit unit 3 outputs the driving control signal C1 to the motor driving unit 9 to switch the energization phases of the coils Lu, Lv and Lw of the plural phases in a predetermined order. The control circuit unit 3 has a rotation state monitoring unit 31, a motor controller 33 and a motor braking unit 35. The control circuit unit 3 may be configured, for example by using DSP (Digital Signal Processor), FPGA (Field Programmable Gate Array), or a programmable device such as a microcomputer.

The position signal is input to the rotation state monitoring unit 31. The rotation state monitoring unit 31 monitors the rotation state of the synchronous motor 10 based on the position signal.

The motor controller 33 generates the driving control signal C1 based on the monitoring result of the rotation state monitoring unit 31. The generated driving control signal C1 is output to the pre-drive circuit 4 of the motor driving unit 9.

The motor braking unit 35 outputs a braking signal C2 to the pre-drive circuit 4 of the motor driving unit 9. When the braking signal C2 is output, the motor driving unit 9 causes the synchronous motor 10 to perform short-circuit braking. The motor braking unit 35 outputs the braking signal C2 to the motor braking unit 35 based on the monitoring result of the rotation state monitoring unit 31. However, the present embodiment is not limited to this style.

The braking signal C2 is output when so-called short-circuit braking (short-circuit brake) is performed. The control circuit unit 3 outputs the braking signal C2 from the motor braking unit 35 to cause the motor to perform the short-circuit braking (execute first control). The short-circuit braking is performed, for example when the activation of the synchronous motor 10 is started.

Here, the basic operation of the motor driving control device 1 will be briefly described.

Figure 2:
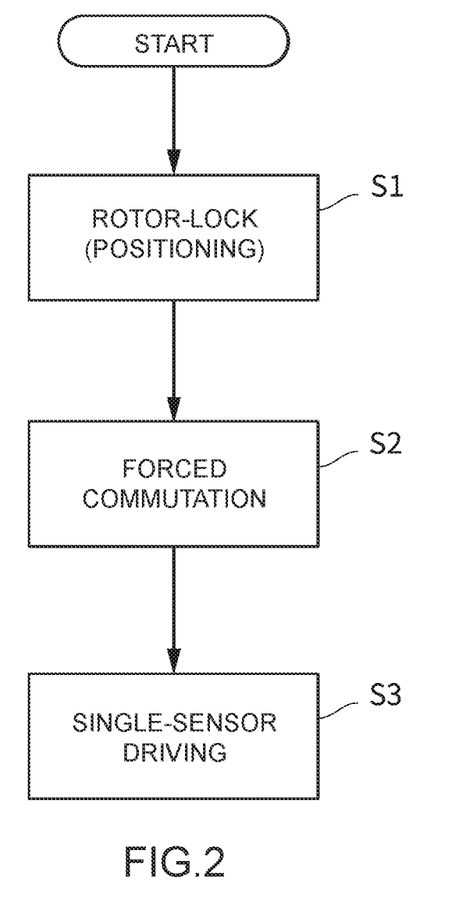
FIG. 2 is a flowchart showing the basic operation of the motor driving control device.

FIG. 2 is a flowchart showing the basic operation of the motor driving control device 1.

As shown in FIG. 2, the motor driving control device 1 roughly performs a positioning operation of the rotor (rotor-lock) (step S1), a forced commutation (step S2) and single-sensor driving (step S3). The control circuit unit 3 performs the control operation to execute these operations.

When starting the activation of the synchronous motor 10, the motor driving control device 1 first performs the positioning operation of the rotor (rotor-lock; step S1). The details of the positioning operation will be described later.

When the operation of the step S1 is finished, the motor driving control device 1 performs the forced commutation of the synchronous motor 10 (step S2).

When the forced commutation operation is performed and the synchronous motor 10 is activated, the motor driving control device 1 performs the single-sensor driving (step S3). That is, the control circuit unit 3 outputs the driving control signal C1 according to the period of the position signal, whereby the control circuit unit 3 switches the energization phases of the coils Lu, Lv and Lw to be energized by the motor driving unit 9 in a predetermined order to drive the synchronous motor 10. As described in detail later, when starting the activation of the motor 10, the control circuit unit 3 executes first control for causing the motor 10 to perform the short-circuit braking, and second control for starting a first lock operation in which coils of a predetermined energization phase out of the three phases are energized with a first current value to lock the rotor after the first control is executed. When executing the first control, the control circuit unit 3 performs the short-circuit braking from the start of the short-circuit braking of the motor 10 until variation of a predetermined pattern of the phase of the position signal has not been detected over a first predetermined time, or from the start of the short-circuit braking of the motor 10 until a second predetermined time longer than the first predetermined time has elapsed.

Next, the positioning operation of the rotor in the present embodiment will be described. In the positioning operation of the rotor, first control, second control and third control are performed by the control circuit unit 3.

The first control causes the synchronous motor 10 to perform the short-circuit braking (perform the short-circuit braking operation) (first control step).

The second control is the control for starting a first lock operation for locking the rotor by energizing coils of a predetermined energization phase out of the coils Lu, Lv and Lw with a first current value (hereinafter referred to as strong rotor-lock operation) (second control step) after the first control is executed.

The third control is the control for performing a second lock operation for locking the rotor by energizing coils of a predetermined energization phase out of the coils Lu, Lv and Lw with a second current value smaller than the first current value (hereinafter referred to as weak rotor-lock operation) for a predetermined time after the first lock operation is performed. The second lock operation is an operation for positioning the rotor with a torque weaker than that in the first lock operation.

Figure 3:
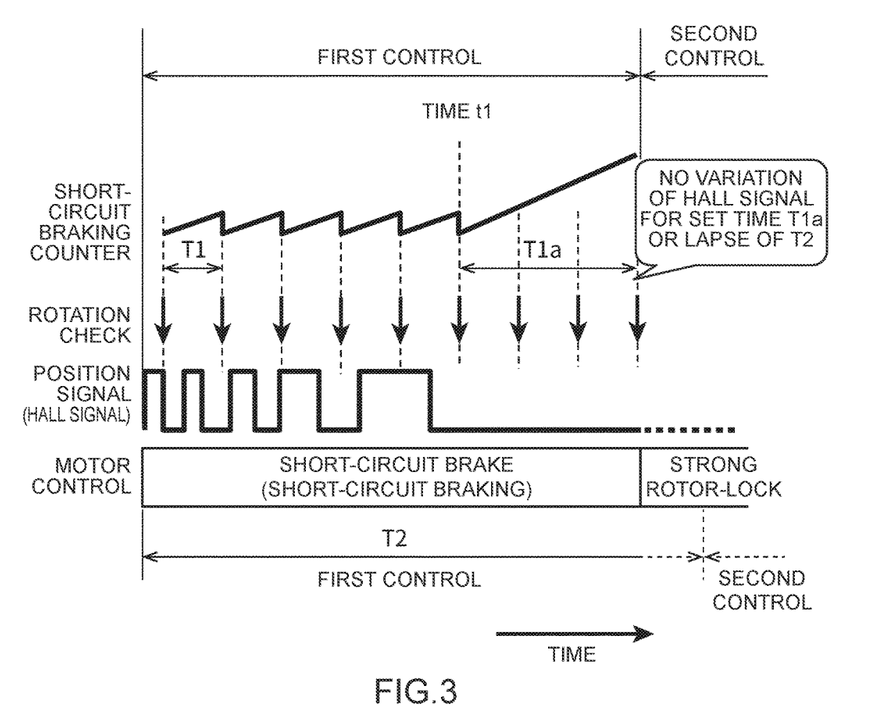
FIG. 3 is a first timing chart showing a positioning operation of a rotor in the present embodiment.
Figure 4:
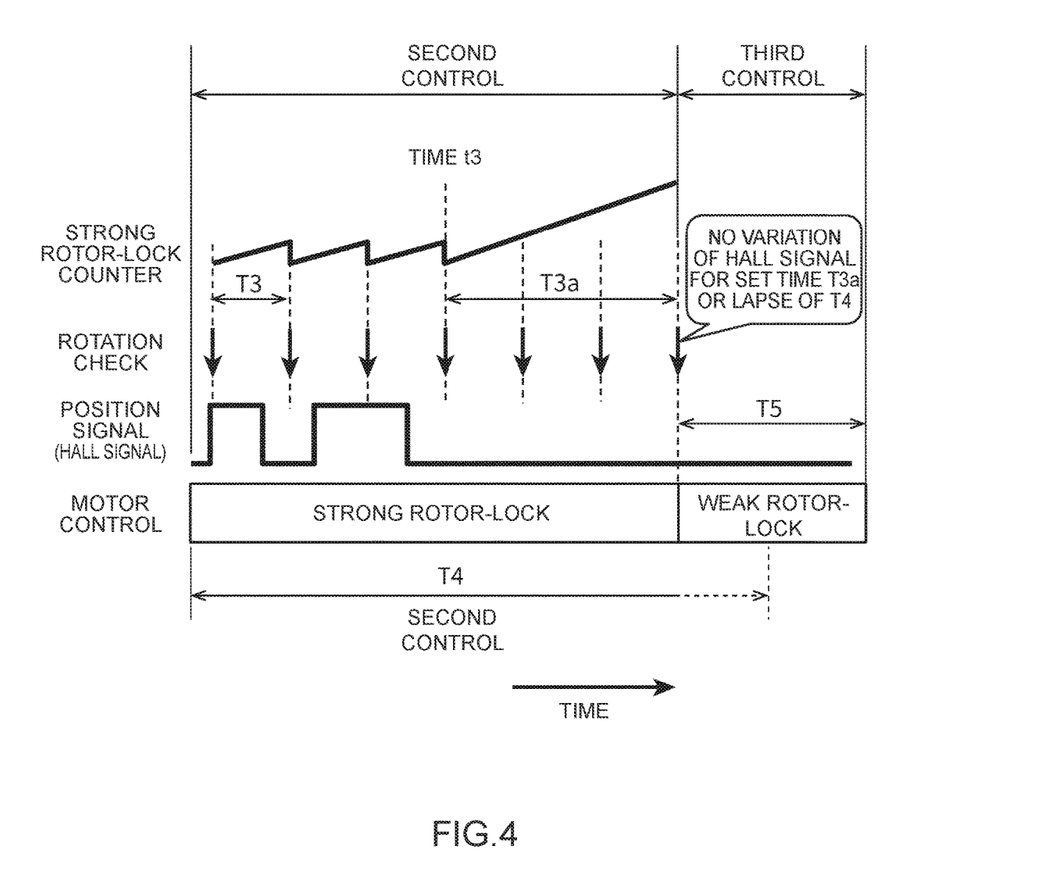
FIG. 4 is a second timing chart showing the positioning operation of the rotor in the present embodiment.

FIG. 3 is a first timing chart showing the positioning operation of the rotor in the present embodiment. FIG. 4 is a second timing chart showing the positioning operation of the rotor in the present embodiment.

FIGS. 3 and 4 show count values associated with the control (a short-circuit braking counter, a rotor-lock (strong) counter), a timing at which the control circuit unit 3 checks the rotation of the rotor of the synchronous motor 10, waveform examples of a position signal (hall signal), and a control state of the motor. FIG. 3 shows an example of the control state from execution of the first control till the start of the second control. FIG. 4 shows an example of the control state from the start of the second control until execution of the third control subsequently to FIG. 3.

In the present embodiment, when the positioning operation is started, the short-circuit braking (short-circuit brake) is first started as shown in FIG. 3. At this time, when the rotor reversely rotates or forwardly rotates due to some cause such as suffering external force, a position signal repeating the high level and the low level alternately is output. The period of the position signal is shorter as the rotation number of the rotor is larger (the rotational speed is higher). The motor is subjected to the short-circuit braking, so that the motor is decelerated. Therefore, the rotation number of the rotor decreases with lapse of time. That is, the period of the position signal becomes longer.

When the first control is executed, the control circuit unit 3 performs the short-circuit braking from the start of the short-circuit braking of the synchronous motor 10 until a predetermined condition is satisfied. Specifically, the control circuit unit 3 performs the short-circuit braking until variation of a predetermined pattern of the phase of the position signal has not been detected over a preset set time (an example of a first predetermined time) T1a. Furthermore, the control circuit unit 3 performs the short-circuit braking from the start of the short-circuit braking of the synchronous motor 10 until a time-out time (an example of a second predetermined time) T2 longer than the set time T1a has elapsed. In other words, when the control circuit unit 3 is performing the short-circuit braking, the control circuit unit 3 finishes the short-circuit braking when a first condition in which the variation of the predetermined pattern of the phase of the position signal has not been detected over the set time T1a is satisfied or a second condition in which the time-out time T2 has elapsed from the start of the short-circuit braking is satisfied.

The first condition is that the rotational speed of the rotor of the synchronous motor 10 decreases by a certain degree. Here, the variation of the predetermined pattern of the phase of the position signal means that the position signal falls from the high level to the low level or rises from the low level to the high level in the present embodiment. In other words, when the rising or falling phase variation of the position signal has not occurred over the set time T1a, the first condition is satisfied. That is, the control circuit unit 3 finishes the short-circuit braking when the position signal has been kept high or low in level over the set time T1a during execution of the short-circuit braking. The control may be performed by using only one of the rising and the falling of the position signal for the variation of the predetermined pattern of the phase of the position signal.

The second condition resides in that the time-out time T2 set as the longest time for which the short-circuit braking is performed has elapsed irrespective of the rotational speed of the rotor of the synchronous motor 10. Even when the short-circuit braking cannot lowered the rotational speed of the rotor a great deal, due to external force or the like, the control circuit unit 3 can shift to the second control based on the lapse of the time-out time T2.

As described in detail below, when executing the first control, the control circuit unit 3 monitors the position signal upon every first monitoring time, performs counting of the first predetermined time continuously from a previous monitoring time when the variation of the predetermined pattern of the phase of the position signal has not been detected since the previous monitoring time, and resets the counting of the first predetermined time when the variation of the predetermined pattern of the phase of the position signal is detected from the previous monitoring time. In the present embodiment, when executing the first control, the control circuit unit 3 monitors the position signal at a preset interval (an example of a first monitoring time) T1. The interval T1 is a time shorter than the set time T1a. In FIG. 3, the position signal is monitored at the timing of the appearance of downward arrows represented as rotation check.

The control circuit unit 3 determines whether the variation of the predetermined pattern of the phase of the position signal is detected during lapse of the interval T1. When the variation of the predetermined pattern of the phase of the position signal has not been detected since the previous monitoring time, the control circuit unit 3 performs the counting of the set time T1a continuously from the previous monitoring time. When the variation of the predetermined pattern of the phase of the position signal is detected from the previous monitoring time, the control circuit unit 3 resets the counting of the set time T1a. That is, the counting of the set time T1a is performed by counting the interval T1. The set time T1a is three times as long as the interval T1, for example. However, the set time T1a is not limited to this length, and it may be the same length as the interval T1.

The control circuit unit 3 counts the set time T1a by using a short-circuit braking counter. That is, the short-circuit braking counter is reset when the variation of the predetermined pattern of the phase of the position signal occurs between the monitoring timings every interval T1 (before the time t1 in FIG. 3). When the variation of the predetermined pattern of the phase of the position signal does not occur between the monitoring timings, the short-circuit braking counter is not reset, and the counting of the set time T1a still continues. When the short-circuit braking counter counts only the set time T1a, the control circuit unit 3 determines that the variation of the predetermined pattern of the phase of the position signal has not been detected during the set time T1a. Such a determination can be easily performed without any complicated circuit configuration for the control circuit unit 3.

In FIG. 3, the state in which the second control is executed, that is, the state in which the strong rotor-lock operation (first lock operation) is started is shown before the time-out time T2 has elapsed because the variation of the predetermined pattern of the phase of the position signal has not been detected over the set time T1a.

When the short-circuit braking is finished as described above, the second control is executed. That is, the strong rotor-lock operation is started as shown in FIG. 4.

As described in detail below, when executing the second control, the control circuit unit 3 performs the strong lock operation from the start of the strong lock operation (first lock operation) until the variation of the predetermined pattern of the phase of the position signal has not been detected over a third predetermined time, or from the start of the strong lock operation until a fourth predetermined time longer than the third predetermined time has elapsed. When the control circuit unit 3 executes the second control to start the strong rotor-lock operation, the control circuit unit 3 continuously performs the strong rotor-lock operation until a predetermined condition is satisfied. Specifically, the control circuit unit 3 performs the strong rotor-lock operation until the variation of the predetermined pattern of the phase of the position signal has not been detected over the preset set time (an example of a third predetermined time) T3a. Furthermore, the control circuit unit 3 performs the strong rotor-lock operation from the start of the strong rotor-lock operation of the synchronous motor 10 until a time-out time (an example of a fourth predetermined time) T4 longer than the set time T3a has lapsed. In other words, when the control circuit unit 3 is performing the strong rotor-lock operation, the control circuit unit 3 finishes the strong rotor-lock operation when the third condition in which the variation of the predetermined pattern of the phase of the position signal has not been detected over the set time T3a is satisfied, or a fourth condition in which the time-out time T4 has elapsed from the start of the strong rotor-lock operation is satisfied.

The third condition resides in that the rotational speed of the rotor of the synchronous motor 10 becomes lower by a certain degree than that in the first condition. In this case, the variation of the predetermined pattern of the phase of the position signal means that the position signal falls or rises. In other hand, when the rising or falling phase variation of the position signal has not occurred over the set time T3$a$, the third condition is satisfied. That is, when the control circuit unit 3 is performing the strong rotor-lock operation, the control circuit unit 3 finishes the strong rotor-lock operation when the position signal has kept the high or low level over the set time T3$a$. The control may be performed by using only one of the falling and rising of the position signal for the variation of the predetermined pattern of the phase of the position signal.

The fourth condition means that the time-out time T4 set as the longest time for which the strong rotor-lock operation is performed has elapsed irrespective of the rotational speed of the rotor of the synchronous motor 10. Even when the strong rotor-lock operation cannot lowered the rotational speed of the rotor a great deal, due to external force or the like, the lapse of the time-out time T4 allows the shift to the third control.

As described in detail below, in the present embodiment, when executing the second control, the control circuit unit 3 monitors the position signal every second monitoring time, performs counting of the third predetermined time continuously from a previous monitoring time when the variation of the predetermined pattern of the phase of the position signal has not been detected since the previous monitoring time, and resets the counting of the third predetermined time when the variation of the predetermined pattern of the phase of the position signal is detected from the previous monitoring time. That is, the control circuit unit 3 monitors the position signal at a preset interval (an example of a second monitoring time) T3 after the execution of the second control. The interval T3 is a time shorter than the set time T3$a$. In FIG. 4, the position signal is monitored at the timing of the appearance of downward arrows represented for rotation check.

The control circuit unit 3 determines whether the variation of the predetermined pattern of the phase of the position signal is detected during lapse of the interval T3. When the variation of the predetermined pattern of the phase of the position signal has not been detected since the previous monitoring time, the control circuit unit 3 performs the counting of the set time T3$a$ continuously from the previous monitoring time. When the variation of the predetermined pattern of the phase of the position signal is detected from the previous monitoring time, the control circuit unit 3 resets the counting of the set time T3$a$. That is, the counting of the set time T3$a$ is performed by counting the interval T3. The set time T3$a$ is three times as long as the interval T3, for example, but it is not limited to this value. The set time T3$a$ may be the same length as the interval T3.

The control circuit unit 3 counts the set time T3$a$ by using a strong rotor-lock counter. That is, the strong rotor-lock counter is reset when the variation of the predetermined pattern of the phase of the position signal occurs between the monitoring timings every interval T3 (before a time t3 in FIG. 4). When the variation of the predetermined pattern of the phase of the position signal does not occur between the monitoring timings, the strong rotor-lock counter is not reset, and the counting of the set time T3$a$ is still continued. When the strong rotor-lock counter counts only the set time T3$a$, the control circuit unit 3 determines that the variation of the predetermined pattern of the phase of the position signal has not been detected during the set time T3$a$. Such a determination can be easily performed without any complicated circuit configuration as the control circuit unit 3.

In FIG. 4, the state where the third control is executed, that is, the state where the weak rotor-lock operation is started is shown before the time-out time T4 has elapsed because the variation of the predetermined pattern of the phase of the position signal has not been detected over the set time T3$a$.

As described in detail below, after performing the strong rotor-lock operation (first lock-operation), the control circuit unit 3 further executes the third control in which the weak rotor-lock operation (second lock operation) for energizing coils of a predetermined energization phase out of the three phases with a second current value smaller than the first current value to lock the rotor is performed for a fifth predetermined time. In the present embodiment, the interval (an example of the second monitoring time) T3 is longer than the interval (an example of the first monitoring time) T1. Specifically, for example, the interval T1 is equal to 2 milliseconds, and the interval T3 is equal to 4 milliseconds. Furthermore, the set time (an example of the third predetermined time) T3$a$ is longer than the set time (an example of the first predetermined time) T1$a$. Specifically, for example, the set time T1$a$ is equal to 6 milliseconds, and the set time T3$a$ is equal to 12 milliseconds. The time-out time (second predetermined time) T2 is longer than the time-out time (fourth predetermined time) T4. Specifically, for example, the time-out time T2 is equal to 1.5 milliseconds, and the time-out time T4 is equal to 1 second. This is because the rotational speed of the rotor is normally lower under the strong rotor-lock operation to be performed subsequently to the short-circuit braking as compared with that under the short-circuit braking.

When the strong rotor-lock operation is performed as described above, the third control is thereafter executed. In the third control, coils of a predetermined energization phase out of the coils Lu, Lv and Lw are energized with the second current value smaller than the first current value under the strong rotor-lock operation, whereby the rotor is locked with a torque weaker than that under the strong rotor-lock operation (weak rotor-lock operation). The weak rotor-lock operation is performed for only a set time (an example of a fifth predetermined time) T5. When the set time T5 has elapsed, the weak rotor-lock operation is finished, and the forced commutation is performed.

As described in detail below, in the present embodiment, when the rotation of the rotor of the motor 10 does not stop when the strong rotor-lock operation (first lock operation) is finished, the control circuit unit 3 advances the energization timing to the coils of the three phases to cause the motor driving unit 9 to perform energization. That is, when it is not determined that the rotation of the rotor of the synchronous motor 10 stops when the strong rotor-lock operation is finished, the energization timing to the coils Lu, Lv and Lw is advanced, and the control circuit unit 3 causes the motor driving unit 9 to perform energization. When the time-out time T4 has elapsed from the start of the strong rotor-lock operation, the control circuit unit 3 does not determine that the rotation of the rotor stops, and finishes the strong rotor-lock operation. That is, when the falling or rising of the position signal is not detected within the set time T3$a$, the control circuit unit 3 determines that the rotation of the rotor stops. When finishing the strong rotor-lock operation because the time-out time T4 has elapsed, the control circuit unit 3 advances the energization timing and shifts to the forced commutation. When the strong rotor-lock operation finishes as described above, the weak rotor-lock operation may be performed in a manner different from the foregoing manner (for example, the set time T5 for which the weak rotor-lock operation is performed is shortened), or the weak rotor-lock operation may not be performed. Since the energization timing is advanced to perform the forced commutation, the probability that the activation of the motor succeeds increases even when a probability that the rotor of the motor does not stop exists.

The positioning operation of the rotor of the control circuit unit 3 as described above will be described with reference to flowcharts.

Figure 5:
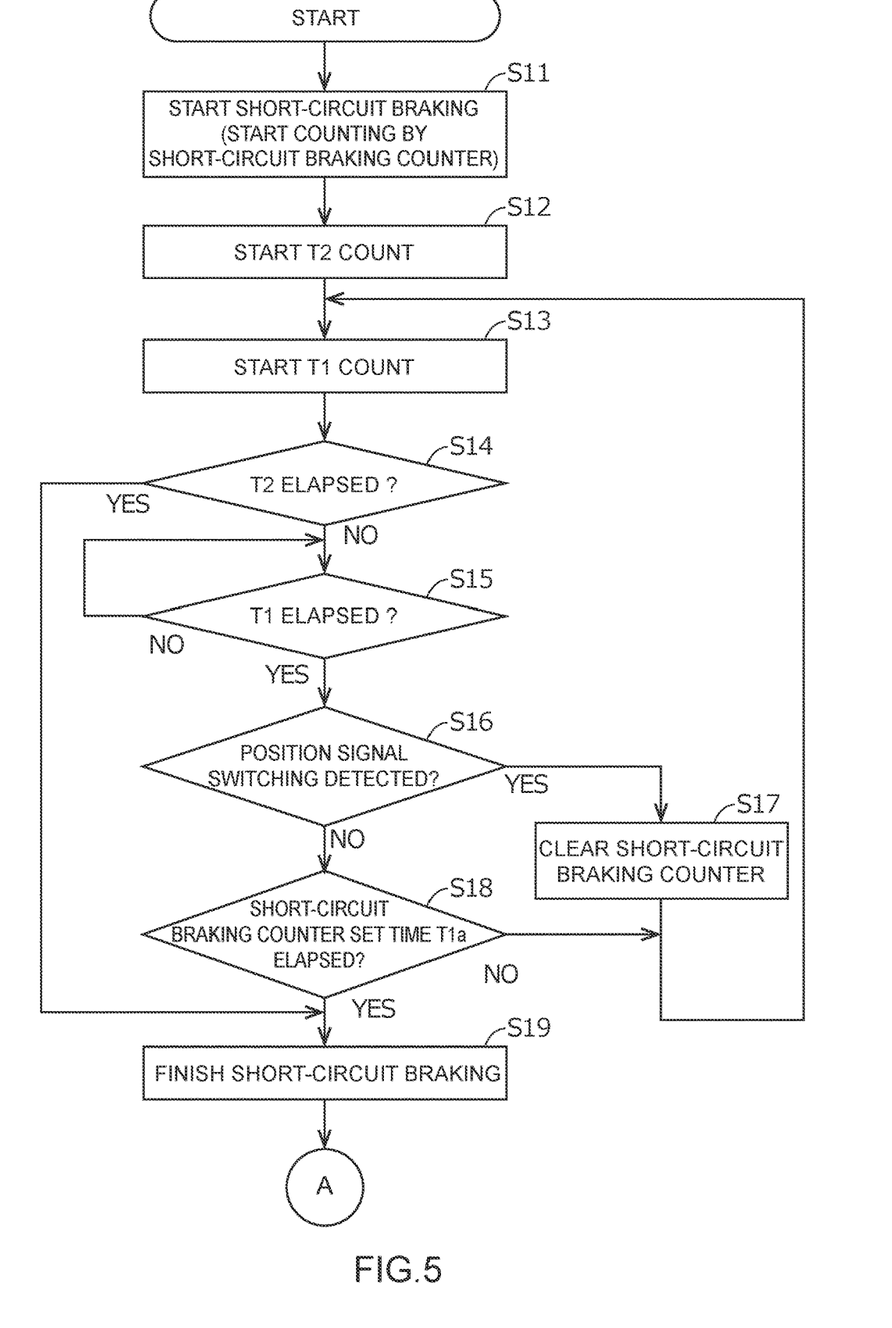
FIG. 5 is a first flowchart showing the positioning operation of the rotor in the present embodiment.
Figure 6:
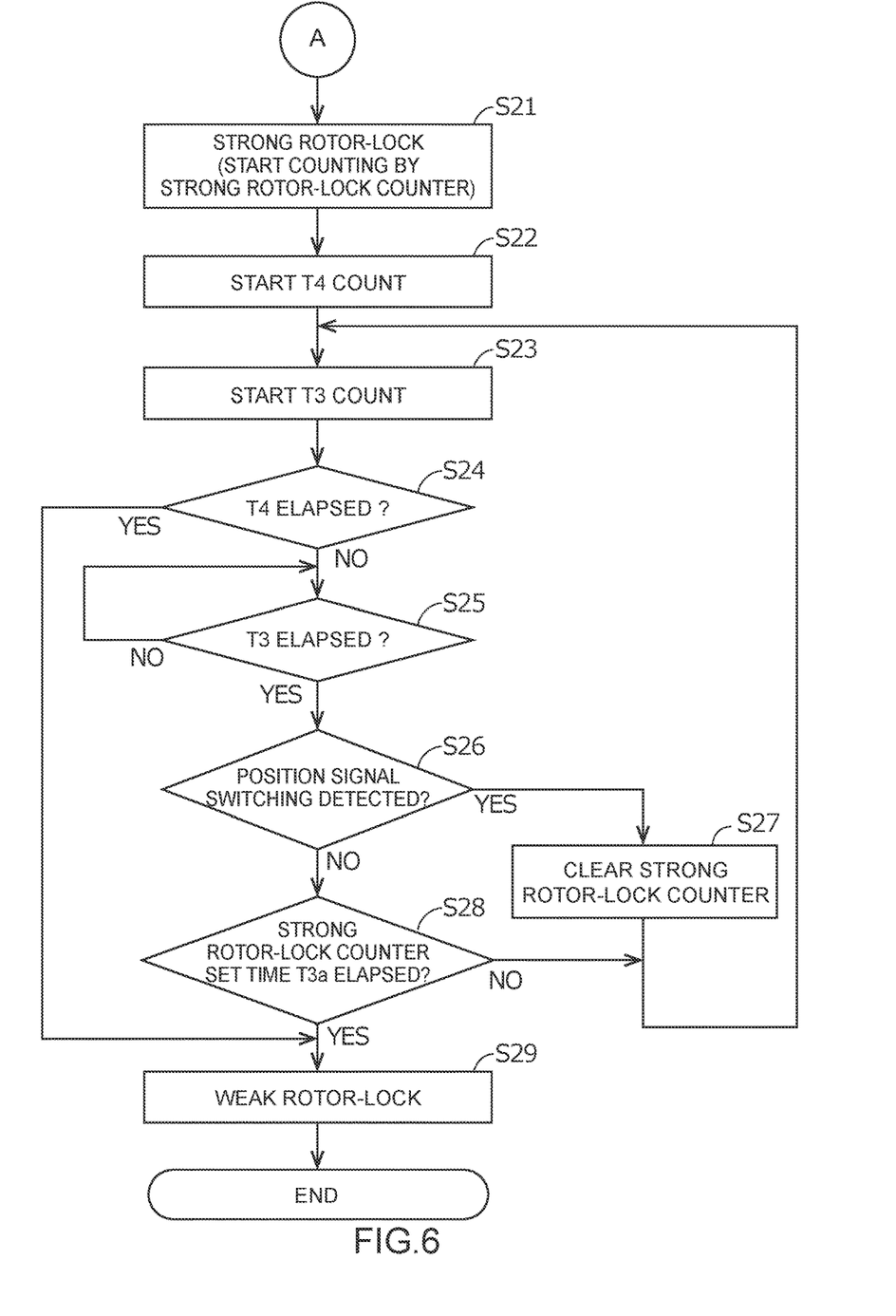
FIG. 6 is a second flowchart showing the positioning operation of the rotor in the present embodiment.

FIG. 5 is a first flowchart showing the positioning operation of the rotor in the present embodiment. FIG. 6 is a second flowchart showing the positioning operation of the rotor in the present embodiment.

As shown in FIG. 5, when the positioning operation of the rotor is started, the control circuit unit 3 starts the short-circuit braking (short-circuit braking operation) (an example of the first control) in step S11. At this time, the counting of the short-circuit braking counter, that is, the counting of the set time T1$a$ is started.

In step S12, the control circuit unit 3 starts the counting of the time-out time T2.

In step S13, the control circuit unit 3 starts the counting of the interval T1.

In step S14, the control circuit unit 3 determines whether the time-out time T2 has elapsed. When the time-out time T2 has elapsed, the control circuit unit 3 goes to step S19. When the time-out time T2 has not elapsed, the control circuit unit 3 goes to step S15.

In step S15, the control circuit unit 3 determines whether the interval T1 has elapsed. When the interval T1 has elapsed, the control circuit unit 3 goes to step S16.

In step S16, the control circuit unit 3 determines whether the position signal is switched, that is, whether the rising or falling of the position signal is detected. When it is detected, the control circuit unit 3 goes to step S17.

When it is determined in step S16 that the switching of the position signal is detected, the short-circuit braking counter is cleared (reset) in step S17. Then, the processing from the step S13 is executed again.

When it is not determined in step S16 that the switching of the position signal is detected, the control circuit unit 3 goes to step S18. In step S18, the control circuit unit 3 determines whether the set time T1$a$ has elapsed. The control circuit unit 3 makes a determination according to the count value of the short-circuit braking counter.

When it is not determined in step S18 that the set time T1$a$ has elapsed, the control circuit unit 3 executes the processing of the step S13 and subsequent steps again without resetting the short-circuit braking counter. That is, the control circuit unit 3 continues the counting for determining whether the set time T1$a$ has elapsed.

When it is determined in step S14 that the time-out time T2 has elapsed, and when it is determined in step S18 that the set time T1$a$ has elapsed, the control circuit unit 3 finishes the short-circuit braking operation in step S19. Thereafter, the control circuit unit 3 goes to step S21 in FIG. 6.

As shown in FIG. 6, when the short-circuit braking operation is finished, the control circuit unit 3 starts the strong rotor-lock operation (an example of the second control) in step S21. At this time, the counting of the strong rotor-lock counter, that is, the counting of the set time T3$a$ is started.

In step S22, the control circuit unit 3 starts the counting of the time-out time T4.

In step S23, the control circuit unit 3 starts the counting of the interval T3.

In step S24, the control circuit unit 3 determines whether the time-out time T4 has elapsed. When the time-out time T4 has elapsed, the control circuit unit 3 goes to step S29. When the time-out time T4 has not elapsed, the control circuit unit 3 goes to step S25.

In step S25, the control circuit unit 3 determines whether the interval T3 has elapsed. When the interval T3 has elapsed, the control circuit unit 3 goes to step S26.

In step 26, the control circuit unit 3 determines whether the position signal is switched, that is, whether the rising or falling of the position signal is detected.

When it is determined in step S26 that the switching of the position signal is detected, the control circuit unit 3 goes to step S27. In step S27, the strong rotor-lock counter is cleared (reset). Then, the processing from the step S23 is executed again.

When it is not determined in step S26 that the switching of the position signal is detected, the control circuit unit 3 goes to step S28. In step S28, the control circuit unit 3 determines whether the set time T3$a$ has lapsed. The control circuit unit 3 determines according to the count value of the strong rotor-lock counter.

When it is not determined in step S28 that the set time T3$a$ has elapsed, the control circuit unit 3 executes the processing of the step S23 and subsequent steps again without resetting the strong rotor-lock counter. That is, the control circuit unit 3 continues the counting for determining whether the set time T3$a$ has elapsed.

When it is determined in step S24 that the time-out time T4 has elapsed, and when it is determined in step S28 that the set time T3$a$ has elapsed, the control circuit unit 3 goes to step S29. In step S29, the control circuit unit 3 finishes the strong rotor-lock operation, and performs the weak rotor-lock operation. The weak rotor-lock operation is performed for only the set time T5. When the weak rotor-lock operation is finished, the positioning operation of the rotor is finished.

Figure 7:
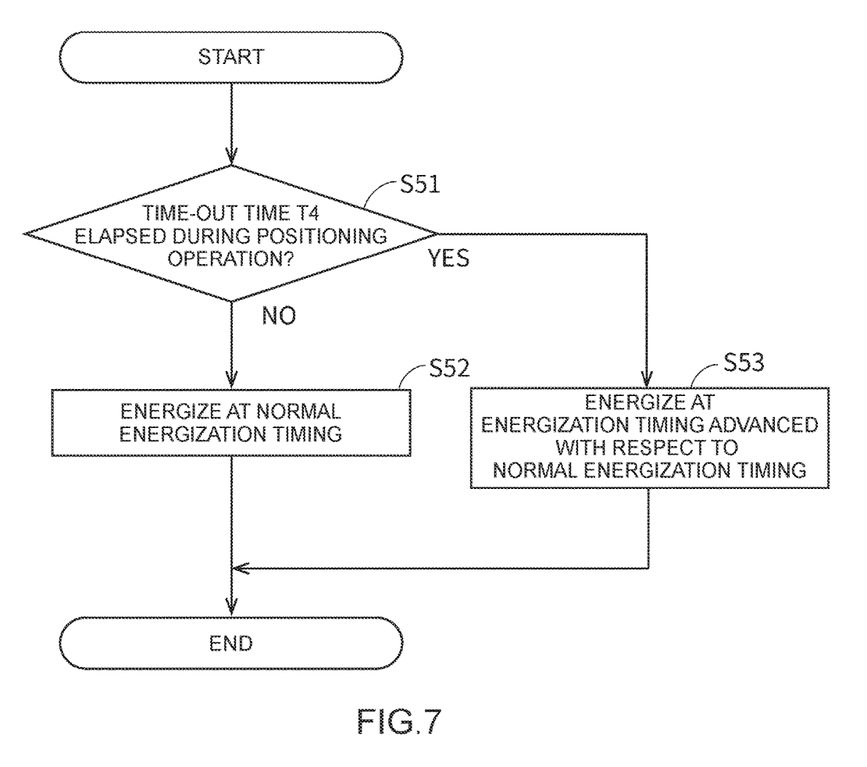
FIG. 7 is a flow chart showing the operation of a control circuit unit at the start time of a forced commutation in a case where rotation of the rotor of a motor does not stop at the time when a strong rotor-lock operation is finished.

FIG. 7 is a flowchart showing the operation of the control circuit unit 3 when the forced commutation is started, when the rotation of the rotor of the motor 10 does not stop after the strong rotor-lock operation (first lock operation) is finished.

As shown in FIG. 7, in step S51, the control circuit unit 3 determines whether the time-out time T4 has elapsed during execution of the strong rotor-lock operation in the positioning operation of the rotor.

When it is not determined in step S51 that the time-out time T4 has elapsed, the control circuit unit 3 controls the energization to the coils Lu, Lv and Lw at a normal energization timing to start the forced commutation in step S52.

On the other hand, when it is determined in step S51 that the time-out time T4 has elapsed, the control circuit unit 3 controls the energization to the coils Lu, Lv and Lw at an energization timing advanced with respect to the normal energization timing to start the forced commutation in step S53.

As described above, according to whether the time-out time T4 has elapsed, it is determined whether the advanced energization timing is adopted.

As described above, in the present embodiment, when the positioning operation of the rotor is performed, the control circuit unit 3 performs the short-circuit braking from the start of the short-circuit braking of the synchronous motor 10 until a predetermined condition (the first condition or the second condition) is satisfied. Therefore, when the positioning operation of the rotor is performed from the state where the rotor substantially stops, the short-circuit braking can be quickly finished upon satisfaction of the first condition. The positioning operation of the rotor can be quickly performed, and the synchronous motor 10 can be quickly activated. Furthermore, even when the positioning operation of the rotor is performed from the state where the rotor rotates, the short-circuit braking can be finished at the point in time when the first condition is satisfied by the short-circuit braking, and the synchronous motor 10 can be quickly activated. Even when the first condition is not satisfied, the short-circuit braking is performed until the second condition is satisfied, so that the positioning operation of the rotor can be performed after the rotational number of the rotor is sufficiently lowered.

After the short-circuit braking is executed, the strong rotor-lock operation is performed until a predetermined condition (the third condition or the fourth condition) is satisfied. The strong rotor-lock operation is quickly finished when the rotational speed of the rotor is set to a low rotational speed state and thus the third condition is satisfied. Accordingly, the positioning operation of the rotor can be more surely performed, and the synchronous motor 10 can be quickly activated according to the presence or absence of external force or the like.

The strong rotor-lock operation is not performed for a time longer than the time-out time T4. Therefore, for example, even under a state where the rotor does not rotate because a load caused by external force or the like is imposed on the rotor, the coils can be prevented from overheating due to energization.

When the rotor of the synchronous motor 10 does not stop at the time when the strong rotor-lock operation is finished, the control is performed at an energization timing advanced with respect to the normal energization timing. Accordingly, when there is any probability that the rotor rotates reversely, and the activation can be performed while advancing the energization timing, so that occurrence of step-out can be prevented.

[Others]

The motor driving control device is not limited to the circuit configurations as shown in the foregoing embodiment and the modification of the foregoing embodiment. Various circuit configurations configured so as to be matched with the purpose of the present disclosure can be applied.

When the first lock operation is finished, the positioning operation of the rotor may be finished without performing the second lock operation. Furthermore, after the short-circuit braking is performed, the first lock operation may be performed for only a predetermined uniform time without performing the foregoing operation. Even in such a condition, the time required for the short-circuit braking operation can be shortened, and the synchronous motor can be quickly activated.

In the present embodiment, the description is made under the condition that the switching element constituting the inverter circuit 2 is MOSFET. However, the switching element is not limited to MOSFET, and may be a bipolar transistor or the like.

The motor to be driven by the motor driving control device according to the present embodiment is not limited to a three-phase brushless motor, and may be various motors having coils of plural phases of two or more phases. Furthermore, a motor for detecting the rotational number of a motor by an FG sensor or the like, etc. may be driving targets to be controlled by the motor driving control device according to the present embodiment.

The above-mentioned flowcharts, etc. are examples for describing the operations, and the present disclosure is not limited to these flowcharts, etc. The steps shown in the respective illustrations of the flowcharts are specific examples, and the present disclosure is not limited to the flow of these steps. For example, the order of the respective steps may be changed, other processing may be inserted between the steps, or the processing may be parallelized.

Some or all parts of the processing in the above-mentioned embodiment may be executed by software or by using hardware circuits. For example, the controller is not limited to a microcomputer. The internal configuration of the controller may be at least partially processed by software.

It should be considered that the description on the above-mentioned embodiment is exemplified in all points, and not restrictive. The scope of the present disclosure is expressed not based on the foregoing description, but based on the scope of claims, and intended to encompass all alterations within meanings and range equivalent to the scope of claims.

What is claimed is:

1. A motor driving control device comprising:
   a motor driving unit for selectively energizing coils of a plurality of phases of a motor;
   a control circuit unit for outputting a driving control signal to the motor driving unit to control an operation of the motor driving unit; and
   a position detector corresponding to one phase of the plurality of phases, the position detector outputting a position signal having a phase varying according to a position of a rotor of the motor, wherein when starting activation of the motor, the control circuit unit executes first control for causing the motor to perform short-circuit braking, and second control for starting a first lock operation in which the rotor is locked by energizing coils of a predetermined energization phase out of the plurality of phases with a first current value after the first control is executed, and when executing the first control, the control unit performs the short-circuit braking from the start of the short-circuit braking of the motor until variation of a predetermined pattern of the phase of the position signal has not been detected over a first predetermined time, or from the start of the short-circuit braking of the motor until a second predetermined time longer than the first predetermined time has elapsed.

2. The motor driving control device according to claim 1, wherein when executing the first control, the control circuit unit monitors the position signal upon every first monitoring time, performs counting of the first predetermined time continuously from a previous monitoring time when the variation of the predetermined pattern of the phase of the position signal has not been detected since the previous monitoring time, and resets the counting of the first predetermined time when the variation of the predetermined pattern of the phase of the position signal is detected from the previous monitoring time.

3. The motor driving control device according to claim 1, wherein upon execution of the second control, the control circuit unit performs the first lock operation from the start of the first lock operation until the variation of the predetermined pattern of the phase of the position signal has not been detected over a third predetermined time, or from the start of the first lock operation until a fourth predetermined time longer than the third predetermined time has elapsed.

4. The motor driving control device according to claim 3, wherein when executing the second control, the control circuit unit monitors the position signal every second monitoring time, performs counting of the third predetermined time continuously from a previous monitoring time when the variation of the predetermined pattern of the phase of the position signal has not been detected since the previous monitoring time, and resets the counting of the third predetermined time when the variation of the predetermined pattern of the phase of the position signal is detected from the previous monitoring time.

5. The motor driving control device according to claim 1, wherein after the first lock operation is performed, the control circuit unit further executes third control for performing, for a fifth predetermined time, a second lock operation in which the rotor is locked by energizing coils of a predetermined energization phase out of the plurality phases with a second current value smaller than the first current value.

6. The motor driving control device according to claim 3, wherein when rotation of the rotor of the motor does not stop at the time when the first lock operation is finished, the control circuit unit advances an energization timing to the coils of the plurality of phases and causes the motor driving unit to perform the energization.

7. A motor driving control method for controlling driving of a motor by using a motor driving control device including a motor driving unit for selectively energizing coils of a plurality of phases of the motor, a control circuit unit for outputting a driving control signal to the motor driving unit to control an operation of the motor driving unit, and a position detector corresponding to one phase out of the plurality of phases, the position detector outputting a position signal having a phase varying according to a position of a rotor of the motor, comprising:

a first control step for performing short-circuit braking of the motor when starting activation of the motor; and     a second control step for starting a first lock operation in which coils of a predetermined phase out of the plurality of phases are energized with a first current value to lock the rotor after the first control step is executed, wherein when the first control step is executed, the short-circuit braking is performed from the start of the short-circuit braking of the motor until variation of a predetermined pattern of the phase of the position signal has not been detected over a first predetermined time, or from the start of the short-circuit braking of the motor until a second predetermined time longer than the first predetermined time has elapsed.

\* \* \* \* \*